(12) United States Patent
Lee et al.

(10) Patent No.: US 11,184,826 B2
(45) Date of Patent: Nov. 23, 2021

(54) METHOD AND APPARATUS FOR HANDLING FAILURE OF SYSTEM INFORMATION REQUEST

(71) Applicant: LG ELECTRONICS INC., Seoul (KR)

(72) Inventors: Youngdae Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 16/612,338

(22) PCT Filed: Jun. 15, 2018

(86) PCT No.: PCT/KR2018/006757
§ 371 (c)(1),
(2) Date: Nov. 8, 2019

(87) PCT Pub. No.: WO2018/230989
PCT Pub. Date: Dec. 20, 2018

(65) Prior Publication Data
US 2020/0178141 A1    Jun. 4, 2020

Related U.S. Application Data

(60) Provisional application No. 62/519,871, filed on Jun. 15, 2017, provisional application No. 62/519,872, filed on Jun. 15, 2017.

(51) Int. Cl.
*H04W 36/24* (2009.01)
*H04W 36/08* (2009.01)
*H04W 48/16* (2009.01)

(52) U.S. Cl.
CPC .......... *H04W 36/24* (2013.01); *H04W 36/08* (2013.01); *H04W 48/16* (2013.01)

(58) Field of Classification Search
CPC . H04W 74/0833; H04W 36/24; H04W 36/08; H04W 36/04; H04W 36/14;
(Continued)

(56) References Cited

U.S. PATENT DOCUMENTS 9,008,659 B1\* 4/2015 Choi ...................... H04W 48/16
455/436
2006/0084443 A1\* 4/2006 Yeo ................... H04W 36/0061
455/449
(Continued)

FOREIGN PATENT DOCUMENTS

| CN | 103327514 | 9/2013 |
|---|---|---|
| WO | 2013006835 | 1/2013 |
| WO | 2016107887 | 7/2016 |

OTHER PUBLICATIONS

PCT International Application No. PCT/KR2018/006757, International Search Report dated Sep. 18, 2018, 4 pages.
(Continued)

*Primary Examiner* — Kiet M Doan
(74) *Attorney, Agent, or Firm* — Lee, Hong, Degerman, Kang & Waimey

(57) ABSTRACT

Provided are a method for a user equipment (UE) to perform a cell reselection in a wireless communication, and an apparatus supporting the same. The method may include: camping on a cell of a base station; initiating a SI request procedure to the base station via the cell; if the initiated system information (SI) request procedure is failed, performing the cell reselection by applying a failure offset to the cell.

10 Claims, 15 Drawing Sheets

(58) Field of Classification Search
CPC ..... H04W 48/02; H04W 48/08; H04W 48/10; H04W 40/12; H04W 48/14; H04W 48/16; H04W 48/18; H04W 48/20; H04W 60/04; H04W 72/085
USPC ............. 455/434, 456.1; 370/278, 230
See application file for complete search history.

(56) References Cited

U.S. PATENT DOCUMENTS

| | | |
|---|---|---|
| 2009/0270104 A1 | 10/2009 | Du et al. |
| 2015/0223258 A1 | 8/2015 | Jung et al. |
| 2016/0050592 A1 | 2/2016 | Kim et al. |
| 2016/0088539 A1* | 3/2016 | Zingler ............. H04W 74/0833 455/436 |
| 2016/0269953 A1 | 9/2016 | Jung et al. |
| 2019/0274091 A1* | 9/2019 | Tang .................... H04W 48/12 |

OTHER PUBLICATIONS

European Patent Office Application Serial No. 18818395.8, Search Report dated Jan. 15, 2020, 13 pages.
Huawei, et al., "Design on MSG1 based request and failure handling", 3GPP TSG RAN WG2 Meeting #98, R2-1705175, May 2017, 3 pages.
Deutsche Telekom, "Our view on the "Chiba Issue"—RACH access failure", 3GPP TSG RAN WG2 Meeting #82, R2-131654, May 2013, 2 pages.
Huawei, et al., "CHIBA issue", 3GPP TSG RAN WG2 Meeting #85bis, R2-141551, Apr. 2014, 4 pages.
Samsung, "On Demand SI: Further Details of MSG1 Approach", 3GPP TSG RAN WG2 Meeting #98, R2-1704049, May 2017, 6 pages.
The State Intellectual Property Office of the People's Republic of China Application Serial No. 201880039556.8, Office Action dated Apr. 6, 2021, 5 pages.

* cited by examiner

METHOD AND APPARATUS FOR HANDLING FAILURE OF SYSTEM INFORMATION REQUEST

CROSS-REFERENCE TO RELATED APPLICATIONS

This application is the National Stage filing under 35 U.S.C. 371 of International Application No. PCT/KR2018/006757, filed on Jun. 15, 2018, which claims the benefit of U.S. Provisional Application No. 62/519,871, filed on Jun. 15, 2017, and 62/519,872, filed on Jun. 15, 2017, the contents of which are all hereby incorporated by reference herein in their entirety.

FIELD OF THE DISCLOSURE

The present invention relates to a wireless communication system, and more particularly, to a method for a user equipment (UE) to handle failure of system information request and an apparatus supporting the same.

RELATED ART

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

System information may include the Minimum SI and the Other SI, in NR, and a random access procedure may be used for requesting the Other SI.

SUMMARY OF THE DISCLOSURE

Meanwhile, in the prior art, the UE should continue to perform RACH procedures for SI request at the same cell, until the requested SI is received. Thus, there may be the case that UE continuously perform RACH access at the edge of the cell while the requested SI has been not received. Such UEs behaving like that increase uplink interference.

One embodiment provides a method for performing, by a user equipment (UE), a cell reselection in a wireless communication. The method may include: camping on a cell of a base station; initiating a SI request procedure to the base station via the cell; and if the initiated system information (SI) request procedure is failed, performing the cell reselection by applying a failure offset to the cell.

Another embodiment provides a user equipment (UE) performing a cell reselection in a wireless communication. The UE may include: a memory; a transceiver; and a processor, connected to the memory and the transceiver, that: camps on a cell of a base station; initiates a SI request procedure to the base station via the cell; and if the initiated system information (SI) request procedure is failed, performs the cell reselection by applying a failure offset to the cell.

The UE does not continuously perform the RACH access for the SI request.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
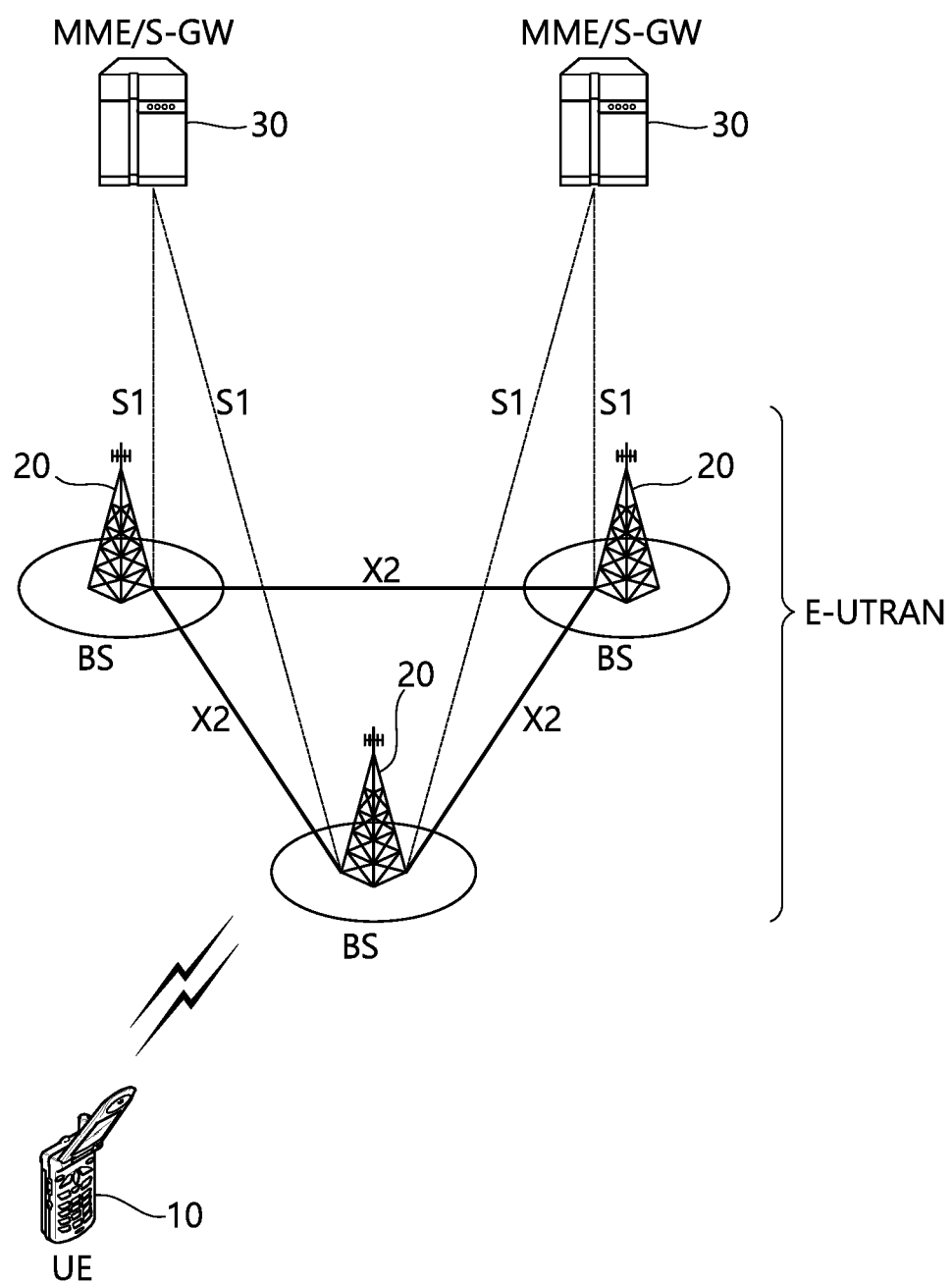
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
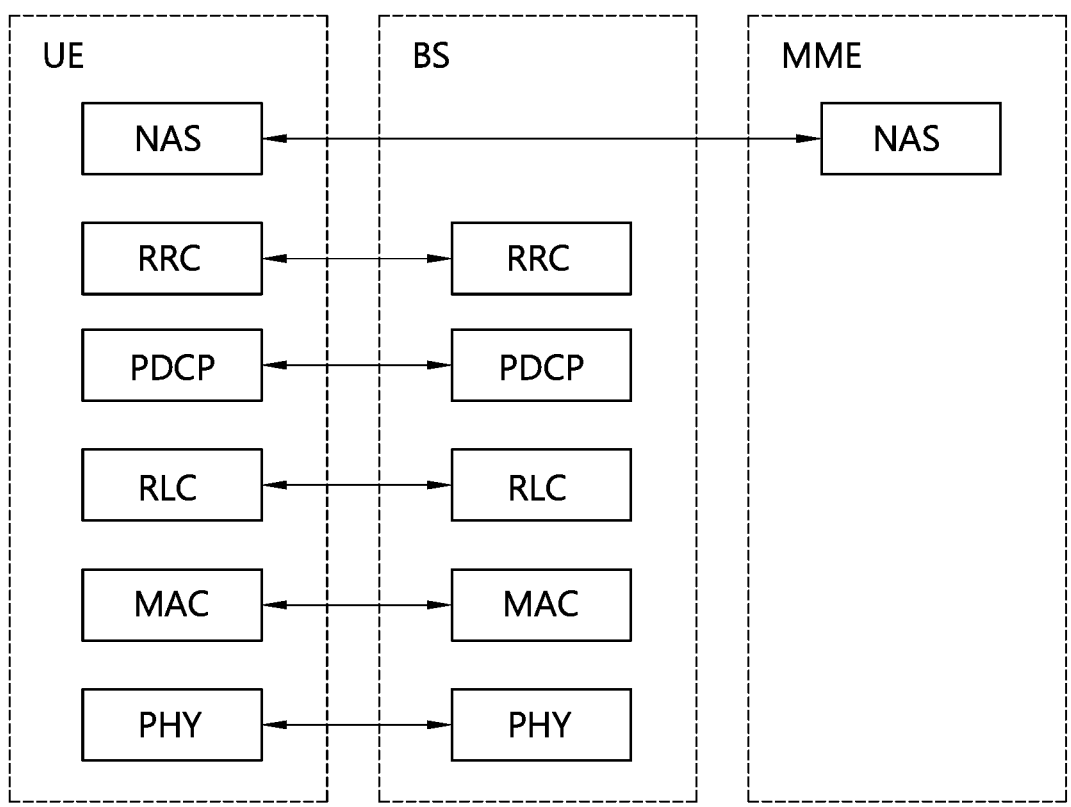
FIG. 2 shows a control plane of a radio interface protocol of an LTE system.
Figure 3:
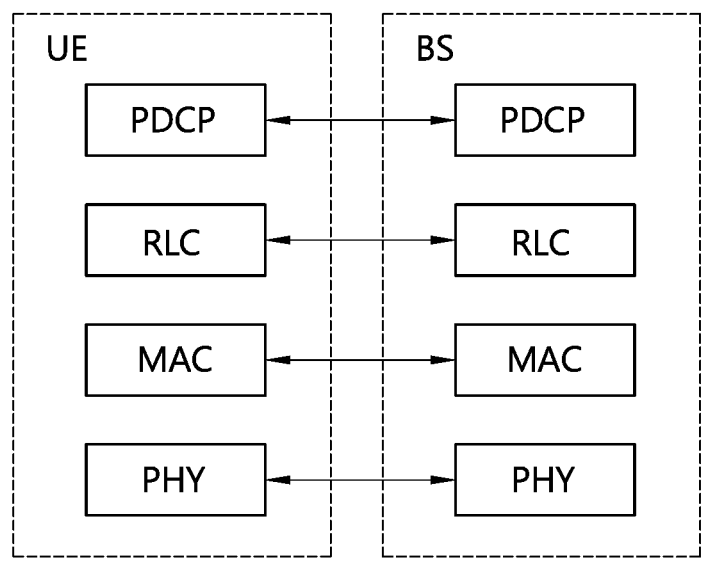
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
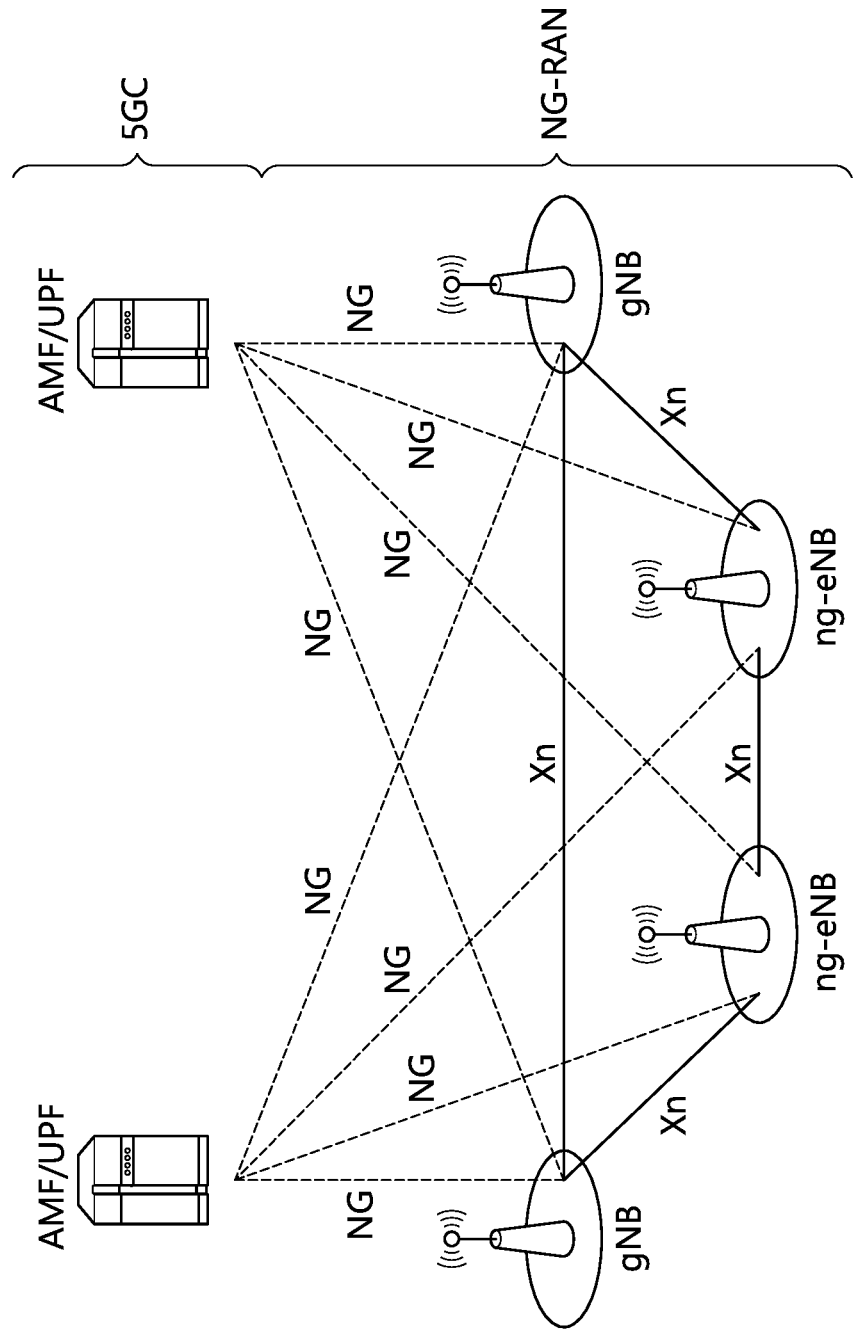
FIG. 4 shows 5G system architecture.

FIG. 4 shows 5G system architecture.

Referring to FIG. 4, a Next Generation Radio Access Network (NG-RAN) node may be either a gNB providing NR Radio Access (NR) user plane and control plane protocol terminations towards the UE or an ng-eNB providing Evolved Universal Terrestrial Radio Access (E-UTRA) user plane and control plane protocol terminations towards the UE. The gNBs and ng-eNBs may be interconnected with each other by means of the Xn interface. The gNBs and ng-eNBs may be also connected by means of the NG interfaces to the 5G Core Network (5GC), more specifically to the AMF (Access and Mobility Management Function) by means of the NG-C interface and to the UPF (User Plane Function) by means of the NG-U interface. The NG-C may be control plane interface between NG-RAN and 5GC, and the NG-U may be user plane interface between NG-RAN and 5GC.

Figure 5:
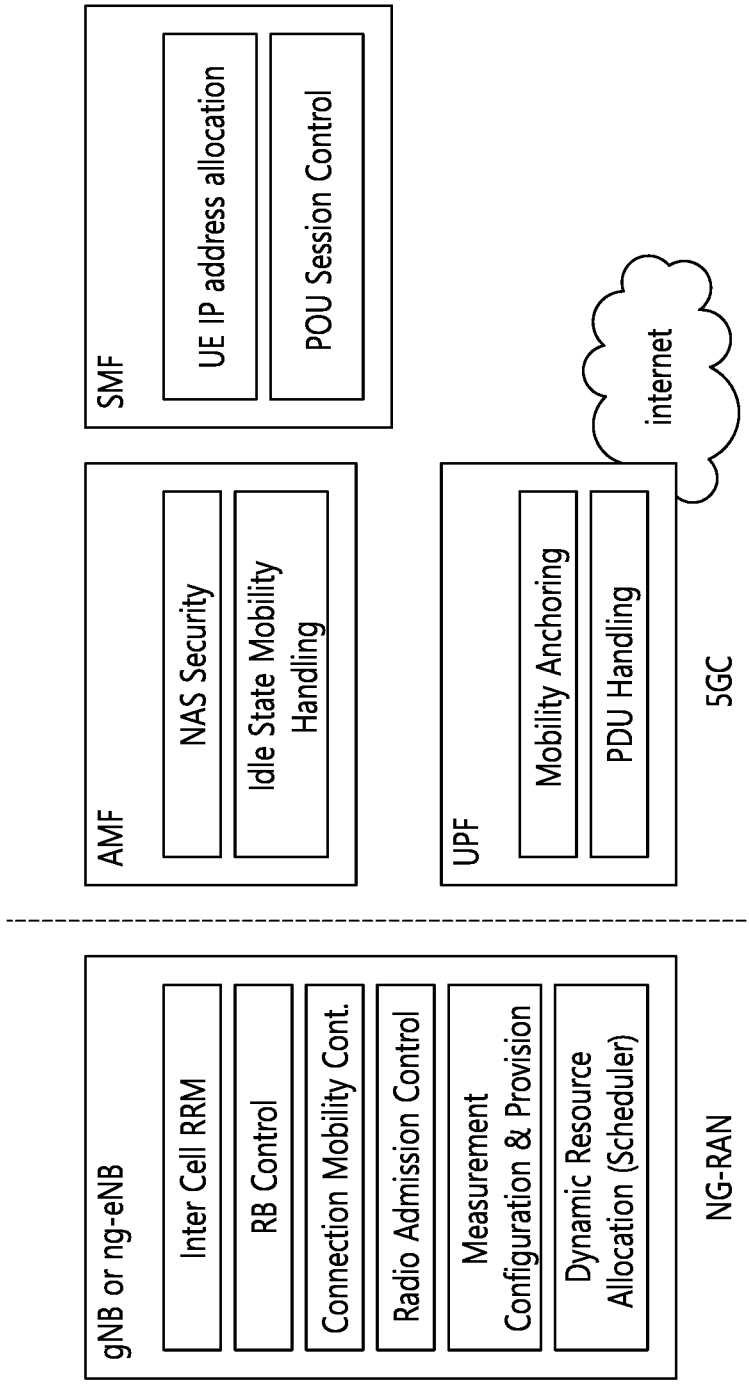
FIG. 5 shows functional split between NG-RAN and 5GC.

FIG. 5 shows functional split between NG-RAN and 5GC

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or O&M);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) may host the following main functions:

NAS signalling termination;
NAS signalling security;
AS Security control;
Inter CN node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
SMF selection.

The User Plane Function (UPF) may host the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

The Session Management function (SMF) may host the following main functions:

Session Management;
UE IP address allocation and management;
Selection and control of UP function;
Configures traffic steering at UPF to route traffic to proper destination;
Control part of policy enforcement and QoS;
Downlink Data Notification.

Hereinafter, a random access procedure in LTE system is described.

First of all, a user equipment performs a random access procedure in the event of one of the following cases.

Case that a user equipment performs an initial access without a connection (e.g., RRC connection) to a base station
Case that a user equipment initially accesses a target cell by a handover procedure
Case requested by a command given by a base station Case that data in uplink is generated in a situation that an uplink time synchronization is not matched or a radio resource used to request a radio resource is not allocated Case of a recovery process in case of a radio link failure (RLF) or a handover failure In LTE system, a non-contention based random access procedure is provided as follows. First of all, a base station assigns a dedicated random access preamble designated to a specific user equipment. Secondly, the corresponding user equipment performs a random access procedure using the random access preamble. So to speak, in a process for selecting a random access preamble, there are a contention based random access procedure and a non-contention based random access procedure. In particular, according to the contention based random access procedure, a user equipment randomly selects one random access preamble from a specific set and then uses the selected random access preamble. According to the non-contention based random access procedure, a random access preamble assigned by a base station to a specific user equipment only is used. Differences between the two kinds of the random access procedures lie in a presence or non-presence of occurrence of a contention problem. The non-contention based random access procedure can be used, as mentioned in the foregoing description, only if a handover process is performed or it is requested by a command given by a base station.

Figure 6:
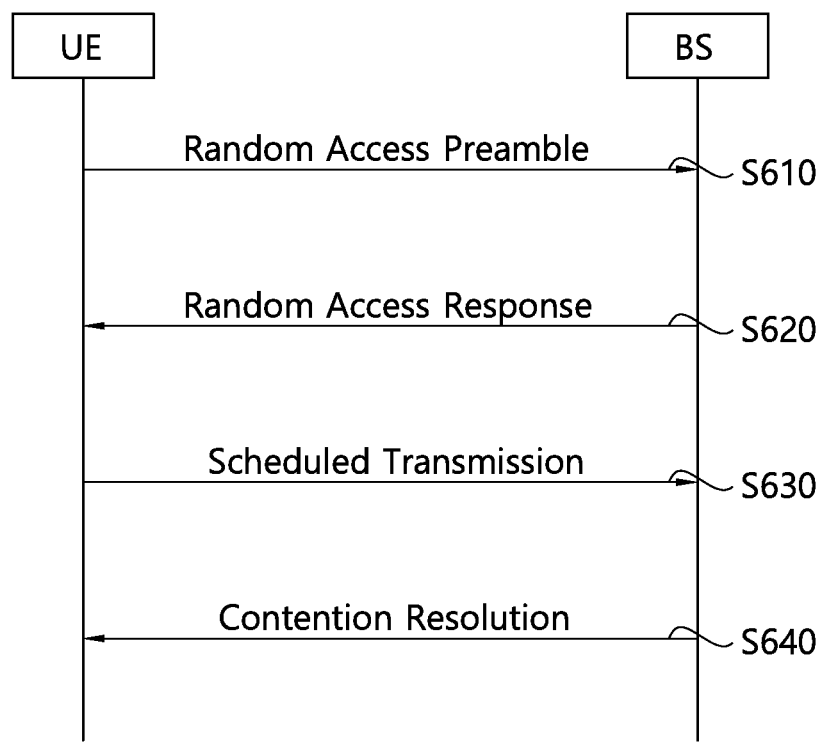
FIG. 6 shows a contention based random access procedure.

FIG. 6 shows a contention based random access procedure.

In step S610, in a contention based random access procedure, a user equipment randomly selects a random access preamble from a set of random access preambles indicated through a system information or a handover command, selects a PRACH (physical RACH) resource capable of carrying the selected random access preamble, and then transmits the corresponding random access preamble through the selected resource.

In step S620, after the user equipment has transmitted the random access preamble in the above manner, it attempts a reception of its random access response within a random access response receiving window indicated through the system information or the handover command from a base station. In particular, the random access response information is transmitted in format of MAC PDU. And, the MAC PDU is delivered through PDSCH (physical downlink shared channel). In order for the user equipment to appropriately receive the information delivered through the PDSCH, PDCCH is delivered as well. In particular, information on the user equipment supposed to receive the PDSCH, frequency and time information of a radio resource of the PDSCH, a transmission format of the PDSCH and the like are included in the PDCCH. Once the user equipment successfully receives the PDCCH transmitted to itself, the user equipment appropriately receives a random access response transmitted on the PDSCH according to the informations of the PDCCH. And, in the random access response, a random access preamble identifier (ID), a UL grant (UL radio resource), a temporary cell identifier (temporary C-RNTI) and time alignment commands (time synchronization correction values, hereinafter abbreviated TAC) are included. As mentioned in the above description, the random access preamble identifier is required for the random access response. The reason for this is described as follows. First of all, since random access response information for at least one or more user equipments may be included in a single random access response, it is necessary to notify that the UL grant, the temporary C-RNTI and the TAC are valid for which one of the user equipments. And, the random access preamble identifier matches the random access preamble selected by the user equipment in the step S610.

In step S630, if the user equipment receives the random access response valid for itself, the user equipment individually processes each of the information included in the received random access response. In particular, the user equipment applies the TAC and saves the temporary C-RNTI. Moreover, the user equipment transmits a data saved in its buffer or a newly generated data to the base station using the received UL grant. In this case, the data included in the UL grant should contain an identifier of the user equipment. In the contention based random access procedure, the base station is unable to determine what kinds of user equipments perform the random access procedure. Hence, in order to resolve the contention in the future, the base station should identify the corresponding user equipment. The identifier of the user equipment can be included by one of two kinds of methods as follows. First of all, if the user equipment has a valid cell identifier previously assigned by a corresponding cell prior to the random access procedure, the user equipment transmits its cell identifier through the UL grant. On the contrary, if the user equipment fails in receiving the valid cell identifier prior to the random access procedure, the user equipment transmits its unique identifier (e.g., S-TMSI, Random Id, etc.) inclusively. In general, the unique ID is longer than a cell identifier. If the user equipment transmits the data through the UL grant, the user equipment initiates a timer for contention resolution (hereinafter called a contention resolution timer).

In step S640, after the user equipment has transmitted the data containing its identifier through the UL grant included in the random access response, it waits for an indication from the base station for the contention resolution. In particular, the user equipment attempts a reception of the PDCCH in order to receive a specific message. In receiving the PDCCH, there are two kinds of methods. As mentioned in the foregoing description, if the user equipment's identifier transmitted through the UL grant is the cell identifier, the user equipment attempts a reception of the PDCCH using its cell identifier. If the identifier is the unique identifier, the user equipment attempts the reception of the PDCCH using the temporary C-RNTI included in the random access response. Thereafter, in the former case, if the user equipment receives the PDCCH through its cell identifier before the expiration of the contention resolution timer, the user equipment determines that the random access procedure has been normally performed and then ends the random access procedure. In the latter case, if the user equipment receives the PDCCH through the temporary cell identifier before the expiration of the contention resolution timer, the user equipment checks data delivered by the PDSCH indicated by the PDCCH. If the unique identifier of the user equipment is included in the substance of the data, the user equipment determines that the random access procedure has been normally performed and then ends the random access procedure.

Figure 7:
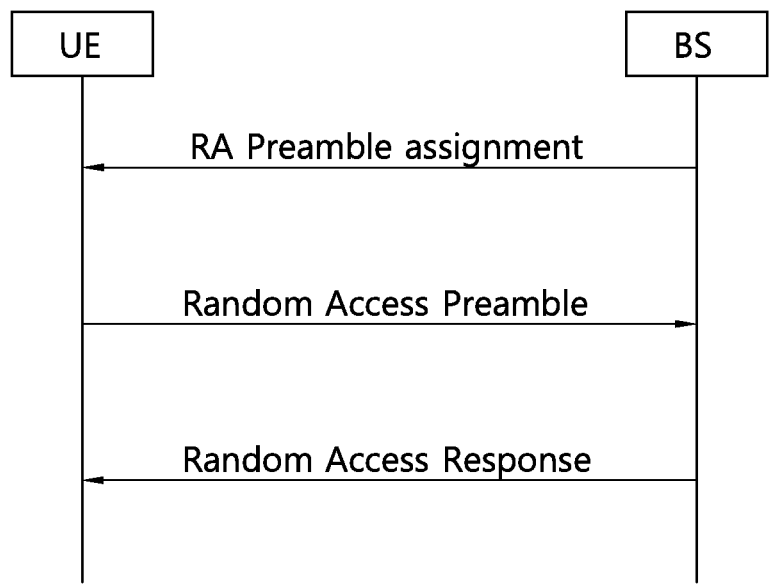
FIG. 7 shows a non-contention based random access procedure.

FIG. 7 shows a non-contention based random access procedure.

Unlike the contention based random access procedure, in a non-contention based random access procedure, if a random access response information is received, a random access procedure is ended by determining that the random access procedure has been normally performed. The non-contention based random access procedure may exist in one of the two cases, i.e., a first case of a handover process and a second case requested by a command given by a base station. Of course, a contention based random access procedure can be performed in one of the two cases. First of all, for a non-contention based random access procedure, it is important to receive a designated random access preamble having no possibility in contention from a base station. The random access preamble can be indicated by a handover command or a PDCCH command After the base station has assigned the random access preamble designated only to the user equipment, the user equipment transmits the preamble to the base station.

Hereinafter, System information (SI) is described.

Figure 8:
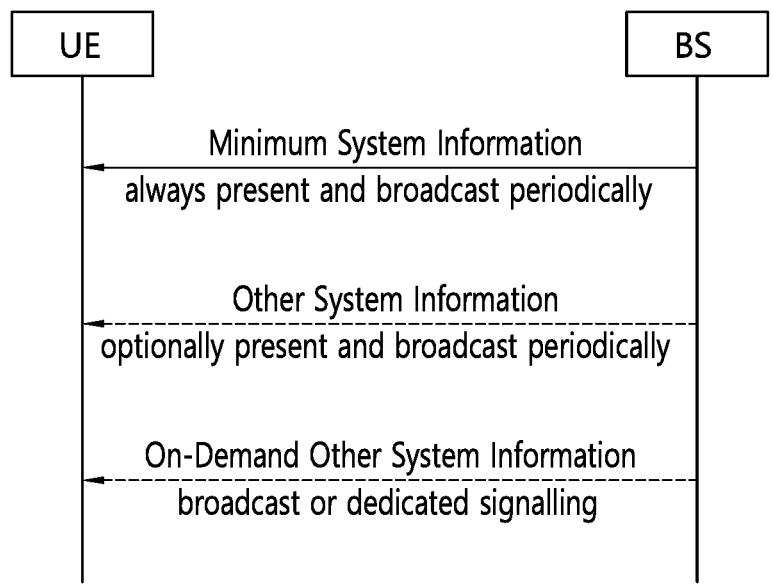
FIG. 8 show a system information acquisition procedure.

FIG. 8 show a system information acquisition procedure.

The system information (SI) may be divided into Minimum SI and Other SI. Minimum SI may be periodically broadcast and comprise basic information required for initial access and information for acquiring any other SI broadcast periodically or provisioned on-demand, i.e. scheduling information. The Other SI may encompass everything not broadcast in the Minimum SI and may either be broadcast, or provisioned in a dedicated manner, either triggered by the network or upon request from the UE. The Minimum SI may be transmitted over two different downlink channels using different messages (MasterInformationBlock and SystemInformationBlockType1). The term Remaining Minimum SI (RMSI) may be also used to refer to SystemInformationBlockType1. Other SI may be transmitted in SystemInformationBlockType2 and above.

Also, the system information (SI) may be divided into the MasterInformationBlock (MIB) and a number of SystemInformationBlocks (SIBs). The MIB may be always transmitted on the BCH with a periodicity of 80 ms and repetitions made within 80 ms. The MIB may include parameters that are needed to acquire SystemInformationBlockType1 (SIB1) from the cell. The SIB1 may be transmitted on the DL-SCH with a certain periodicity and repetitions made within certain period. The SIB1 may include information regarding the availability and scheduling (e.g. periodicity, SI-window size) of other SIBs. Also, the SIB1 may indicate whether they (i.e. other SIBs) are provided via periodic broadcast basis or only on-demand basis. If other SIBs are provided on-demand then SIB1 may include information for the UE to perform SI request. SIBs other than SystemInformationBlockType1 may be carried in SystemInformation (SI) messages, which are transmitted on the DL-SCH. Each SI message is transmitted within periodically occurring time domain windows (referred to as SI-windows).

The UE may apply the SI acquisition procedure to acquire the AS and NAS information. The procedure may apply to UEs in RRC_IDLE, in RRC_INACTIVE and in RRC_CONNECTED. The UE in RRC_IDLE and RRC_INACTIVE shall ensure having a valid version of (at least) the MasterInformationBlock, SystemInformationBlockType1 as well as SystemInformationBlockTypeX through SystemInformationBlockTypeY (depending on support of the concerned RATs for UE controlled mobility). The UE in RRC_CONNECTED shall ensure having a valid version of (at least) the MasterInformationBlock, SystemInformationBlockType1 as well as SystemInformationBlockTypeX (depending on support of mobility towards the concerned RATs). The UE shall store relevant SI acquired from the currently camped/serving cell. A version of the SI that the UE acquires and stores remains valid only for a certain time. The UE may use such a stored version of the SI e.g. after cell re-selection, upon return from out of coverage or after SI change indication.

As mentioned above, the SI may include the Minimum SI and the Other SI, in NR. A BS does not broadcast the Other SI, and a UE may request transmission of Other SI by triggering random access procedure. After completion of the Random Access procedure, UE may receive the Other SI according to the request. That is, the Random Access procedure may be used for requesting the Other SI. In the present specification, the Other SI which is transmitted by requesting of the UE may be referred to as on-demand system information.

Meanwhile, in the prior art, the UE should continue to perform RACH procedures for SI request at the same cell, until the requested SI is received. Thus, there may be the case that UE continuously perform RACH access at the edge of the cell while the requested SI has been not received. Such UEs behaving like that increase uplink interference. Hereinafter, a method for a UE to handle failure of system information request and an apparatus supporting the same according to an embodiment of the present invention are described in detail.

Figure 9:
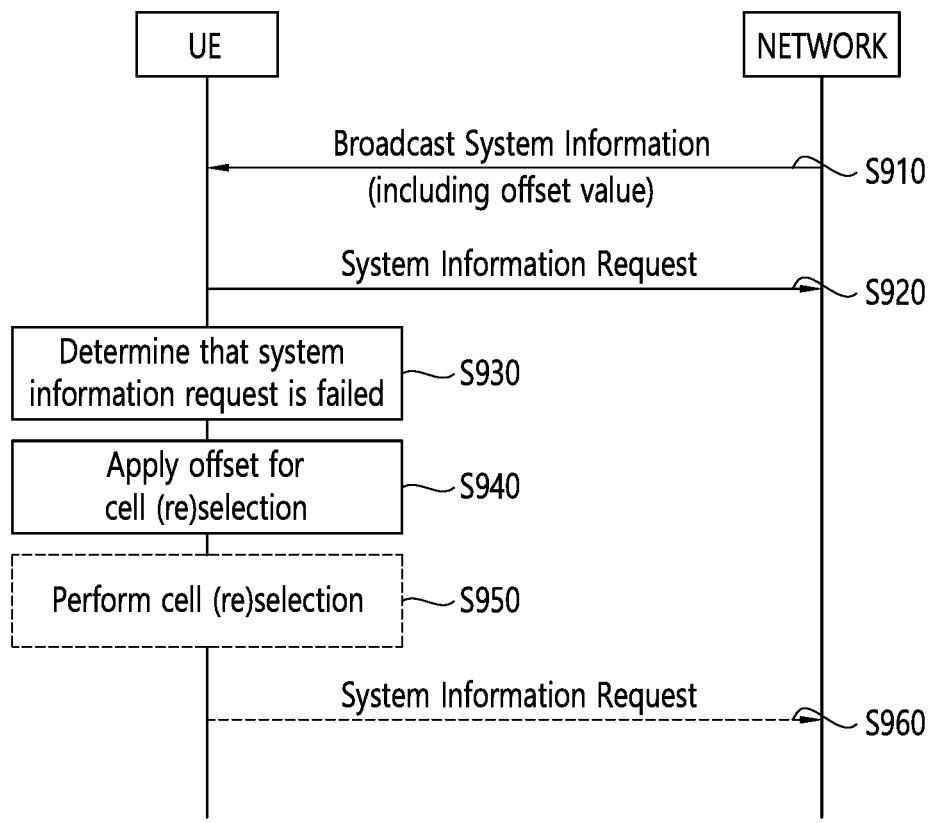
FIG. 9 shows an RACH procedure for acquiring on-demand system information according to an embodiment of the present invention.

FIG. 9 shows an RACH procedure for acquiring on-demand system information according to an embodiment of the present invention.

Referring to FIG. 9, in step S910, a UE may receive broadcast system information for a cell from the network. The network may include at least one base station. The base station may be gNB. The broadcast system information may include whether transmission of the other system information is scheduled or not. The other system information may be the on-demand system information which is provisioned on-demand. Further, the broadcast system information may include an offset for cell selection and cell reselection. The offset may be applied for calculating a cell selection RX level value, i.e., Srxlev, and/or a cell selection quality value, i.e., Squal. The offset may be applied for calculating a ranking for serving cell and/or a ranking for neighbouring cells.

In step S920, the UE may request transmission of the other system information to the network by sending a system information (SI) request message to the base station. The UE may perform random access procedure to send the SI request message. In the random access procedure, the UE may transmit at least one a random access preamble. The SI request message may be either the random access preamble itself or the message 3 of the random access procedure. For example, the message 3 may correspond to a message which transmits in step S630 of the FIG. 6. If the SI request message is the message 3, UE may transmit a random access preamble, and receive a random access response including uplink grant of the message 3 in response to the random access preamble. And then, the UE may transmit the message 3 using the uplink grant. The SI request message may indicate one or more requested system information messages. The SI request message may indicate one or more requested system information blocks.

In step S930, the UE may determine that the UE fails to request transmission of the other system information to the base station at a cell when at least one of the following cases occurs:

If the UE does not receive a response or an acknowledgement to the SI request message for the cell; or If the random access procedure used to send the SI request message is unsuccessfully completed for the cell (e.g. due to no response, no positive acknowledgement or no random access contention resolution); or If the random access problem is indicated for the cell (e.g. when the maximum number of random access attempts is reached in the random access procedure used to send the SI request message).

In step S940, the UE may apply the offset either to the cell or the frequency of the cell in the cell selection or the cell reselection procedure, when at least one of the following conditions is met:

If the UE fails to request transmission of the other system information to the base station (once or N times); and/or If the requested system information message or the requested system information block is not received for the cell; and/or If the UE does not receive the other system information, a SI message or a System Information Block for a certain duration.

The offset may be a cell specific offset or a frequency specific offset.

According to an embodiment of the present invention, the UE may calculate a cell selection criterion S with the offset, i.e., Qoffsetfailure, for a cell selection. The UE may apply the offset only for a certain duration in the cell selection. The certain duration may be fixed or configured by the base station. If the certain duration elapses, the UE may not apply the offset in the cell selection. For example, the cell selection criterion S may be defined by the Equation 1.

$$Srxlev>0 \text{ AND } Squal>0 \qquad <\text{Equation 1}>$$

For the cell selection, the UE may determine that the cell selection criterion S in normal coverage is fulfilled when the equation 1 is satisfied. For example, the Srxlev is defined by the Equation 2, and the Squal is defined by the Equation 3.

$$Srxlev=Qrxlevmeas-(Qrxlevmin+Qrxlevminoffset)-\\Pcompensation-Qoffsetfailure-Qoffsettemp \qquad <\text{Equation 2}>$$

In the Equation 2, the Srxlev may be cell selection RX level value (dB), and the Qrxlevmeas may be measured cell RX level value (RSRP), and the Qrxlevmin may be minimum required RX level in the cell (dBm), and the Qrxlevminoffset may be offset to the signaled Qrxlevmin taken into account in the Srxlev evaluation as a result of a periodic search for a higher priority PLMN while camped normally in a VPLMN, and the Qoffsettemp may be offset temporarily applied to a cell.

$$Squal=Qqualmeas-(Qqualmin+Qqualminoffset)-\\Qoffsetfailure-Qoffsettemp \qquad <\text{Equation 3}>$$

In the Equation 3, the Squal may be cell selection quality value (dB), and the Qqualmeas may be measured cell quality value (RSRQ), and Qqualmin may be minimum required quality level in the cell (dB), and the Qqualminoffset may be offset to the signaled Qqualmin taken into account in the Squal evaluation as a result of a periodic search for a higher priority PLMN while camped normally in a VPLMN, and the Qoffsettemp may be offset temporarily applied to a cell.

According to an embodiment of the present invention, the Qoffsetfailure may be applied for calculating Srxlev and Squal. The Qoffsetfailure may be offset temporarily applied to a cell when SI request procedure fails (dB). Namely, the Qoffsetfailure may be offset temporarily applied to a cell if RACH for SI request fails. As a result, the condition of the Equation 1 may become more difficult to satisfy, so that the problem such that the UE continuously perform RACH access at the edge of the cell while the requested SI has been not received can be solved.

Alternatively, the Qoffsettemp may include the Qoffsetfailure. That is, the offset temporarily applied to a cell when SI request procedure fails may be included in the Qoffsettemp, implicitly.

According to an embodiment of the present invention, the UE may calculate a cell ranking criterion with the offset, i.e., Qoffsetfailure, for a cell reselection. For the cell reselection, the UE may apply intra-frequency and equal priority inter-frequency cell reselection criteria. The UE may apply the offset only for a certain duration in the cell reselection. The certain duration may be fixed or configured by the base station. If the certain duration elapses, the UE may not apply the offset in the cell reselection. For example, the cell ranking criterion for a serving cell (Rs) may be defined by the Equation 4.

$$Rs=Qmeas,s+Qhyst-Qoffsetfailure-Qoffsettemp \qquad <\text{Equation 4}>$$

In the Equation 4, the Qmeas,s may be RSRP measurement quantity used in cell reselections, and the Qoffsettemp may be offset temporarily applied to a cell.

According to an embodiment of the present invention, the Qoffsetfailure may be applied for calculating the Rs. The Qoffsetfailure may be offset temporarily applied to a cell when SI request procedure fails (dB). Namely, the Qoffsetfailure may be offset temporarily applied to a cell if RACH for SI request fails. As a result, the Rs applying the Qoffsetfailure may be smaller than Rs not applying the Qoffsetfailure, so that the problem such that the UE continuously perform RACH access at the edge of the cell while the requested SI has been not received can be solved.

Alternatively, the Qoffsettemp may include the Qoffsetfailure. That is, the offset temporarily applied to a cell when SI request procedure fails may be included in the Qoffsettemp, implicitly.

For example, the cell ranking criterion for a neighbouring cells (Rn) may be defined by the Equation 5.

$$Rn=Qmeas,n-Qoffset-Qoffsettemp \qquad <\text{Equation 5}>$$

In the Equation 5, the Qmeas,n may be RSRP measurement quantity used in cell reselections, and the Qoffsettemp may be offset temporarily applied to a cell. That is, Qoffsetfailure is not applied for the cell ranking criterion for the neighbouring cells (Rn). Alternatively, for example, the cell ranking criterion for the neighbouring cells (Rn) may be defined by the Equation 6.

$$Rn=Qmeas,n-Qoffset+Qoffsetfailure-Qoffsettemp \qquad <\text{Equation 6}>$$

In the Equation 6, the Qmeas,n may be RSRP measurement quantity used in cell reselections, and the Qoffsettemp may be offset temporarily applied to a cell. According to an embodiment of the present invention, the Qoffsetfailure may be applied for calculating the Rn. The Qoffsetfailure may be offset temporarily applied to a cell when SI request procedure fails (dB). As a result, the Rn applying the Qoffsetfailure may be larger than Rn not applying the Qoffsetfailure, so that the problem such that the UE continuously perform RACH access at the edge of the cell while the requested SI has been not received can be solved.

In step S950, after applying the offset in the cell selection or the cell reselection procedure, the UE may perform the cell selection or the cell reselection based on the cell selection criterion S applied the offset or the cell ranking criterion applied the offset. Further, the UE may stop requesting transmission of the other system information at a current cell.

In step S960, the UE may request transmission of the other system information at the selected cell or the reselected cell.

Figure 10:
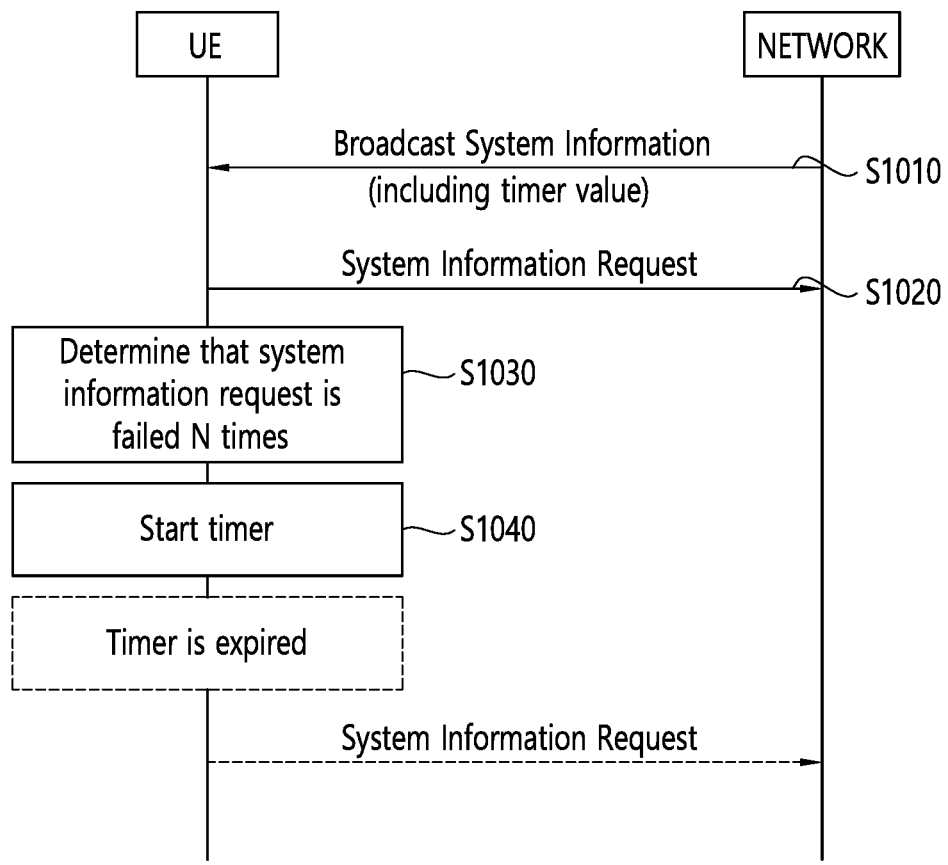
FIG. 10 shows an RACH procedure for acquiring on-demand system information according to an embodiment of the present invention.

FIG. 10 shows an RACH procedure for acquiring on-demand system information according to an embodiment of the present invention.

Referring to FIG. 10, in step S1010, a UE may receive broadcast system information for a cell from the network.

The network may include at least one base station. The base station may be gNB. The broadcast system information may include whether transmission of the other system information is scheduled or not. The other system information may be the on-demand system information which is provisioned on-demand. Further, the broadcast system information may include a timer value. The UE cannot request transmission of the other system information to the base station via the cell.

In step S1020, the UE may request transmission of the other system information to the network by sending a system information (SI) request message to the base station. The UE may perform random access procedure to send the SI request message. In the random access procedure, the UE may transmit at least one a random access preamble. The SI request message may be either the random access preamble itself or the message 3 of the random access procedure. For example, the message 3 may correspond to a message which transmits in step S630 of the FIG. 6. If the SI request message is the message 3, UE may transmit a random access preamble, and receive a random access response including uplink grant of the message 3 in response to the random access preamble. And then, the UE may transmit the message 3 using the uplink grant. The SI request message may indicate one or more requested system information messages. The SI request message may indicate one or more requested system information blocks.

In step S1030, the UE may determine that the UE fails to request transmission of the other system information to the base station at a cell when at least one of the following cases occurs:
  If the UE does not receive a response or an acknowledgement to the SI request message for the cell; or
  If the random access procedure used to send the SI request message is unsuccessfully completed for the cell (e.g. due to no response, no positive acknowledgement or no random access contention resolution); or
  If the random access problem is indicated for the cell (e.g. when the maximum number of random access attempts is reached in the random access procedure used to send the SI request message).

In step S1040, if the UE fails to request transmission of the other system information to the base station N times, the UE may start the timer for the cell. The value of the timer may be included in the broadcast system information which is received in step S1010. The N may be an integer, and the N may be 1 or more. The N may be fixed or configured by the base station. While the timer is running, if the UE is still camping on the cell, the UE may not request transmission of the other system information to the base station for the cell. The timer is expired if at least one of the following conditions is met:
  when the timer reaches the value broadcast in system information; or
  when the UE reselects to anther cell; or
  when the UE receives the requested system information, i.e. the other system information; or
  when the UE enters RRC_CONNECTED state.

After the timer is expired, if the UE camps on the cell, the UE may be allowed to request transmission of the other system information to the base station.

Figure 11:
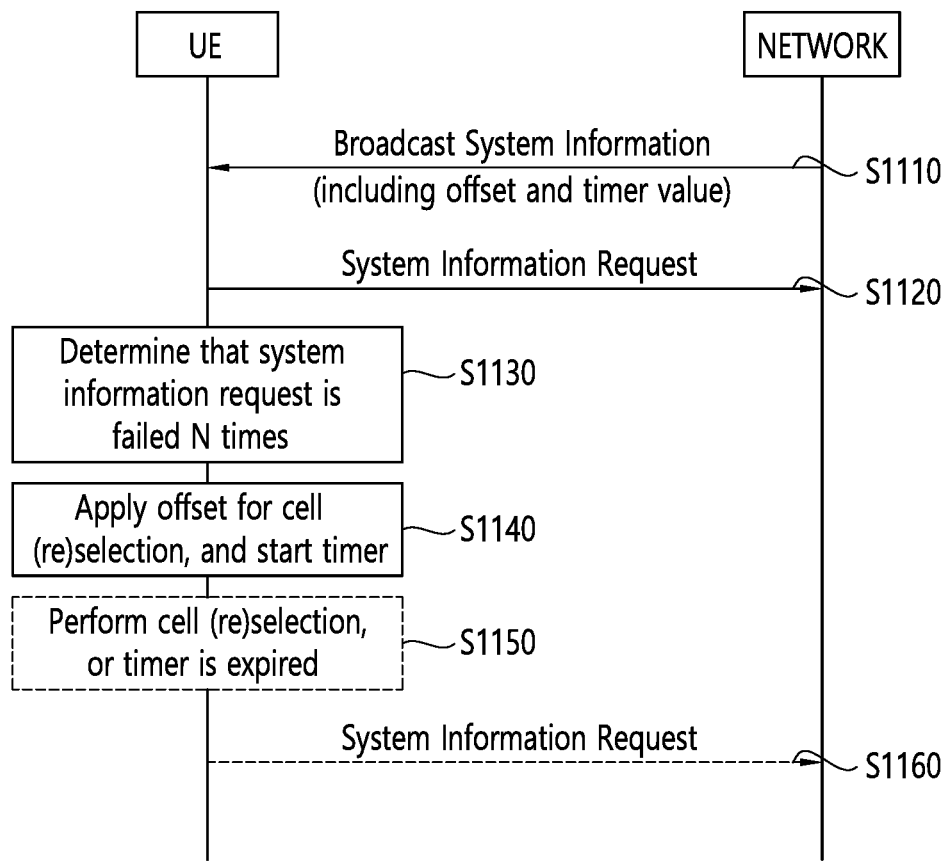
FIG. 11 shows an RACH procedure for acquiring on-demand system information according to an embodiment of the present invention.

FIG. 11 shows an RACH procedure for acquiring on-demand system information according to an embodiment of the present invention.

Referring to FIG. 11, in step S1110, a UE may receive broadcast system information for a cell from the network. The network may include at least one base station. The base station may be gNB. The broadcast system information may include whether transmission of the other system information is scheduled or not. The other system information may be the on-demand system information which is provisioned on-demand. Further, the broadcast system information may include an offset for cell selection and cell reselection. The offset may be applied for calculating a cell selection RX level value, i.e., Srxlev, and/or a cell selection quality value, i.e., Squal. The offset may be applied for calculating a ranking for serving cell and/or a ranking for neighbouring cells. Further, the broadcast system information may include a timer value. The UE cannot request transmission of the other system information to the base station via the cell.

In step S1120, the UE may request transmission of the other system information to the network by sending a system information (SI) request message to the base station. The UE may perform random access procedure to send the SI request message. In the random access procedure, the UE may transmit at least one a random access preamble. The SI request message may be either the random access preamble itself or the message 3 of the random access procedure. For example, the message 3 may correspond to a message which transmits in step S630 of the FIG. 6. If the SI request message is the message 3, UE may transmit a random access preamble, and receive a random access response including uplink grant of the message 3 in response to the random access preamble. And then, the UE may transmit the message 3 using the uplink grant. The SI request message may indicate one or more requested system information messages. The SI request message may indicate one or more requested system information blocks.

In step S1130, the UE may determine that the UE fails to request transmission of the other system information to the base station at a cell when at least one of the following cases occurs:
  If the UE does not receive a response or an acknowledgement to the SI request message for the cell; or
  If the random access procedure used to send the SI request message is unsuccessfully completed for the cell (e.g. due to no response, no positive acknowledgement or no random access contention resolution); or
  If the random access problem is indicated for the cell (e.g. when the maximum number of random access attempts is reached in the random access procedure used to send the SI request message).

In step S1140, the UE may apply the offset either to the cell or the frequency of the cell in the cell selection or the cell reselection procedure, and start the timer for the cell, when at least one of the following conditions is met:
  If the UE fails to request transmission of the other system information to the base station (once or N times); and/or
  If the requested system information message or the requested system information block is not received for the cell; and/or
  If the UE does not receive the other system information, a SI message or a System Information Block for a certain duration.

The UE calculates the cell selection criterion S and/or the cell ranking criterion with the offset. The method by which the UE applies the offset in the cell selection and cell reselection can be referred to FIG. 9.

In step S1150, after applying the offset in the cell selection or the cell reselection procedure, the UE may perform the cell selection or the cell reselection based on the cell selection criterion S applied the offset or the cell ranking criterion applied the offset. Further, the UE may stop requesting transmission of the other system information at a current cell. Then, in step S1160, the UE may request transmission of the other system information at the selected cell or the reselected cell.

Alternatively, in step S1150, after the timer is expired, if the UE camps on the cell, the UE may be allowed to request transmission of the other system information to the base station. Then, in step S1160, the UE may request transmission of the other system information at the current cell or the current cell.

Figure 12:
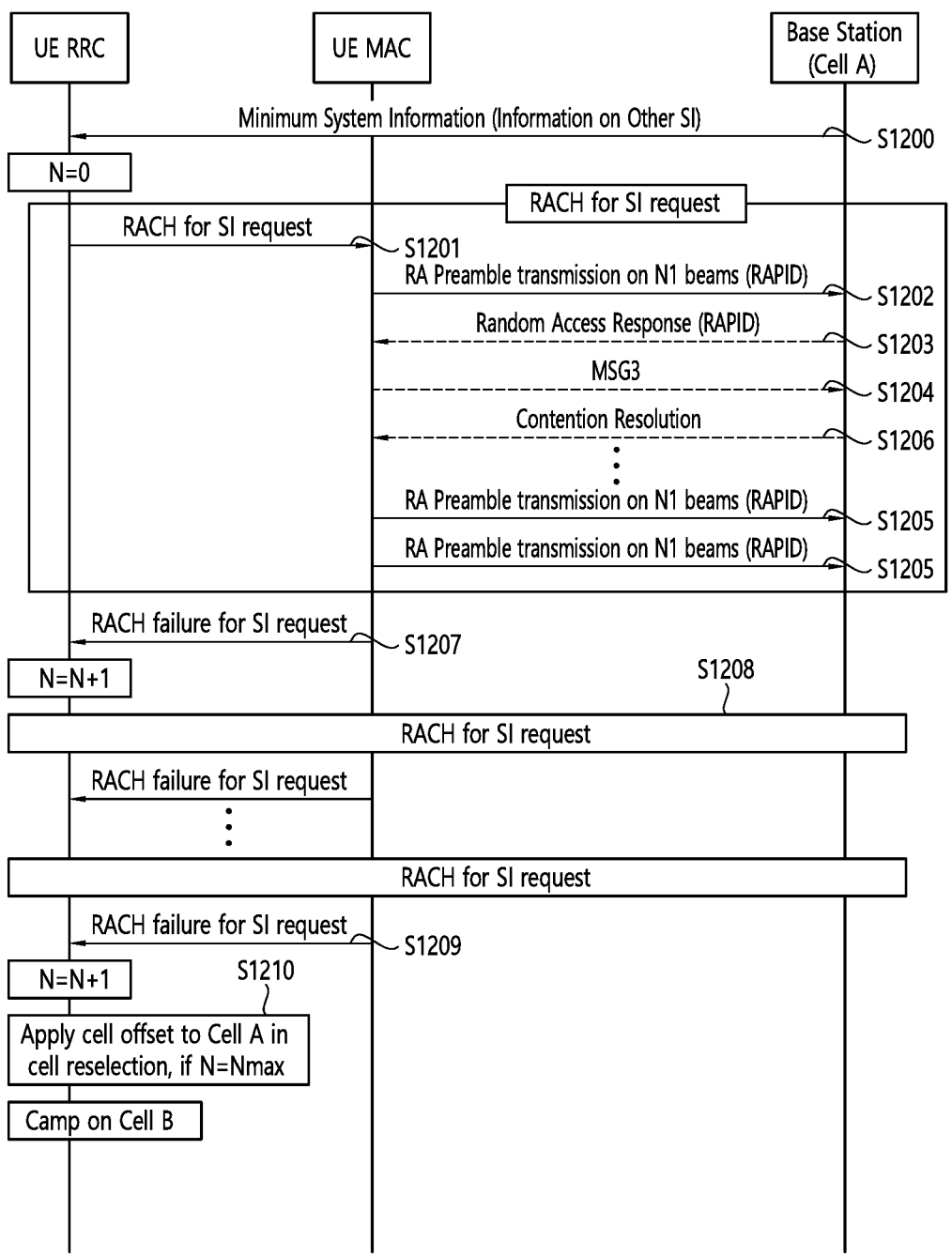
FIG. 12 shows an RACH procedure for acquiring on-demand system information according to an embodiment of the present invention.

FIG. 12 shows an RACH procedure for acquiring on-demand system information according to an embodiment of the present invention.

Referring to FIG. 12, in step S1200, a UE may camp on a cell. For example, the cell may be cell A. An RRC layer of the UE may receive minimum system information at the cell. The minimum system information may broadcast whether UE should request Other SI to the cell or not. The minimum system information may also broadcast Qoffsetfailure which is used when SI request procedure fails, i.e., RACH for SI request fails.

In step S1201, if the UE has not received the Other SI yet at the cell and if the minimum system information informs the UE that the UE should request Other SI, the RRC layer of the UE, i.e., UE RRC, may initiate an RRC SI request procedure for one or more system information messages or one or more system information blocks, and trigger an random access procedure to request Other SI. After triggering the Random Access procedure, UE RRC starts a prohibit timer.

When the random access procedure is triggered for SI request, a MAC layer of the UE, i.e., UE MAC, may perform the steps from S1202 to S1207.

In step S1202, the UE MAC may select one of random access preamble identifiers (RAPIDs) and transmit a random access preamble with the selected RAPID.

In step S1203, the UE MAC may receive the random access response (RAR) message indicating the transmitted RAPID and an uplink grant. If the UE MAC receives no RAR indicating the transmitted RAPID, the UE MAC may re-transmit a random access preamble with power ramping.

In step S1204, the UE MAC may transmit SI Request indication (i.e. message 3, either in a RRC message or in a MAC Control Element) to the base station by using the uplink grant. The base station may be gNB.

In step S1205, if the UE MAC does not receive positive HARQ acknowledgement to the message 3 or if UE MAC receives uplink grant for re-transmission of the message 3, the UE MAC may re-transmit SI Request indication to the base station. If the UE MAC does not receive positive HARQ acknowledgement to the message 3 until the maximum re-transmission of message 3 has been reached, the UE MAC may re-transmit a random access preamble.

In step S1206, if the UE MAC receives contention resolution to the message 3 from the base station (e.g. via PDCCH or Contention Resolution MAC Control Element), the UE MAC may consider the RACH procedure successful. Otherwise, the UE MAC may re-transmit a random access preamble.

In any step from S1202 to S1206, if the maximum re-transmission of random access preambles is reached, the UE MAC may inform the UE RRC about RACH failure for SI request in step S1207.

In step S1208, upon receiving the RACH failure for SI request from the UE MAC, when the prohibit timer is expired, the UE RRC may re-trigger the random access procedure for SI request in the same RRC SI request procedure. While the prohibit timer is running, the UE RRC may not (re-)trigger the random access procedure for SI request.

Alternatively, upon receiving the RACH failure for SI request from the UE MAC, the UE RRC may stop the RRC SI request procedure. When the prohibit timer is expired, the UE RRC may re-initiate the RRC SI request procedure and so trigger the random access procedure for SI request in the RRC SI request procedure.

In step S1209, if the UE RRC receives the RACH failure for SI request N times, the UE RRC may consider that the RRC SI Request procedure fails and so it is unsuccessfully completed. The N is an integer, 1 or more. The N may be fixed or configured by the base station.

In step S1210, the UE may apply an offset, i.e., Qoffsetfailure, to the cell in cell selection or cell reselection when one or more of the following conditions are met:
  If the RRC SI Request procedure is unsuccessfully completed (i.e. if the UE RRC receives the RACH failure for SI request N times); and/or
  If the requested other SI has been not received yet for the cell; and/or
  If the UE does not receive the other SI, a SI message or a SIB for a certain duration (when UE does not request other SI yet).

In step S1210, for the cell selection, the UE may determine that the cell selection criterion S in normal coverage is fulfilled when the Equation 1 is satisfied. Then, the UE may perform cell selection by using the cell selection criterion S in normal coverage.

In step S1210, for the cell reselection, the UE may apply intra-frequency and equal priority inter-frequency cell reselection criteria. The cell ranking criterion Rs for serving cell is defined by the Equation 4. The cell ranking criterion Rn for neighbouring cells is defined by the Equation 5 or the Equation 6. The UE shall perform ranking of all cells that fulfil the cell selection criterion S, but may exclude all CSG cells that are known by the UE not to be CSG member cells. The cells shall be ranked according to the R criteria specified above, deriving Qmeas,n and Qmeas,s and calculating the R values using averaged RSRP results. If a cell is ranked as the best cell, the UE shall perform cell reselection to that cell, e.g., cell B. That is, the UE camping on the cell A may reselect the cell B.

Figure 13:
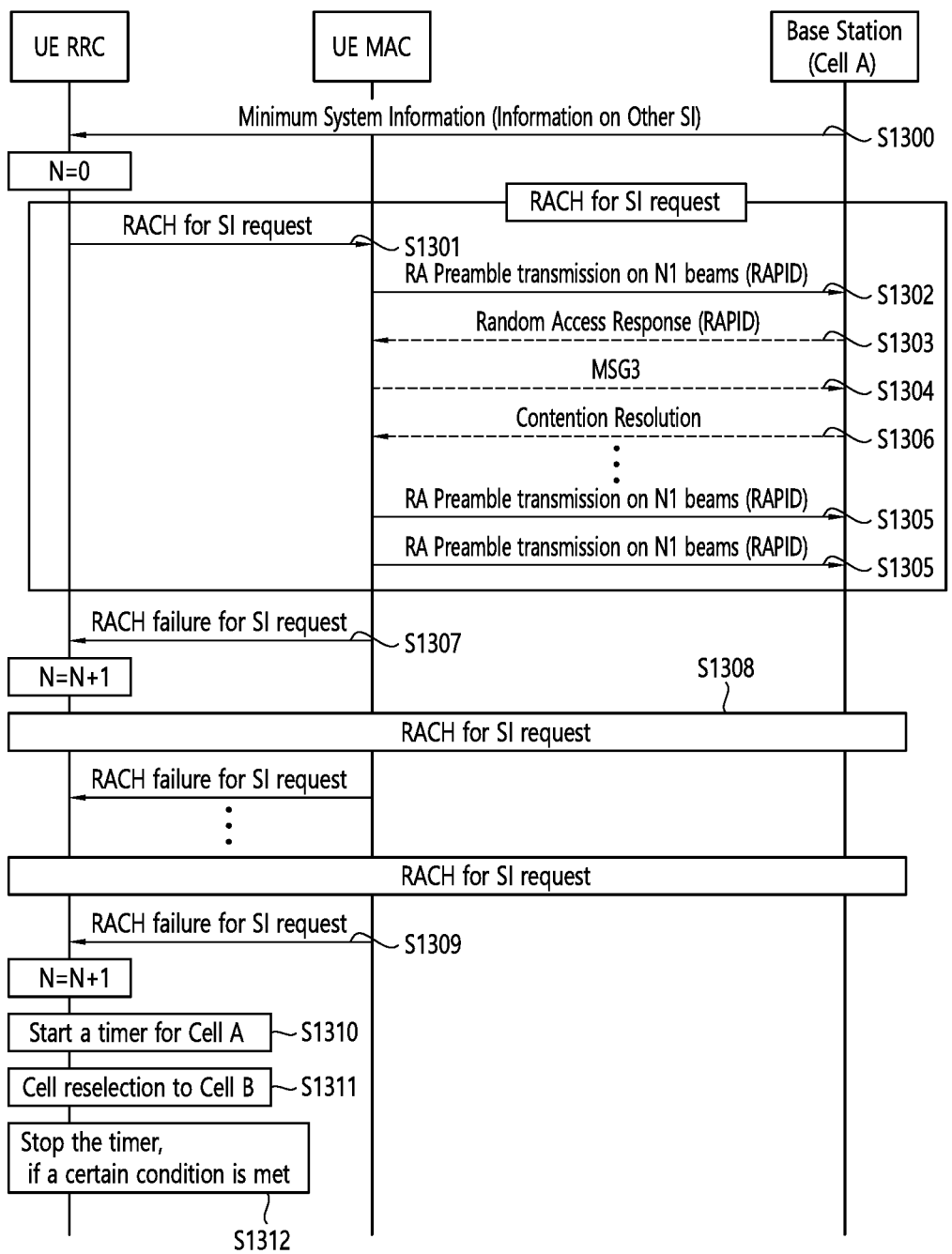
FIG. 13 shows an RACH procedure for acquiring on-demand system information according to an embodiment of the present invention.

FIG. 13 shows an RACH procedure for acquiring on-demand system information according to an embodiment of the present invention.

Referring to FIG. 13, in step S1300, a UE may camp on a cell. For example, the cell may be cell A. An RRC layer of the UE may receive minimum system information at the cell. The minimum system information may broadcast whether UE should request Other SI to the cell or not. The minimum system information may also broadcast a SI request prohibit timer which is used when SI request procedure fails, i.e., RACH for SI request fails.

In step S1301, if the UE has not received the Other SI yet at the cell and if the minimum system information informs the UE that the UE should request Other SI, the RRC layer of the UE, i.e., UE RRC, may initiate an RRC SI request procedure for one or more system information messages or one or more system information blocks, and trigger an random access procedure to request Other SI. After triggering the Random Access procedure, UE RRC starts a RACH prohibit timer.

When the random access procedure is triggered for SI request, a MAC layer of the UE, i.e., UE MAC, may perform the steps from S1302 to S1307. Since the steps from S1302 to S1307 is same as the steps from S1202 to S1207, detailed description is omitted.

In step S1308, upon receiving the RACH failure for SI request from the UE MAC, when the RACH prohibit timer is expired, the UE RRC may re-trigger the random access procedure for SI request in the same RRC SI request procedure. While the RACH prohibit timer is running, the UE RRC may not (re-)trigger the random access procedure for SI request.

Alternatively, upon receiving the RACH failure for SI request from the UE MAC, the UE RRC may stop the RRC SI request procedure. When the RACH prohibit timer is expired, the UE RRC may re-initiate the RRC SI request procedure and so trigger the random access procedure for SI request in the RRC SI request procedure.

In step S1309, if the UE RRC receives the RACH failure for SI request N times, the UE RRC may consider that the RRC SI Request procedure fails and so it is unsuccessfully completed. The N is an integer, 1 or more. The N may be fixed or configured by the base station.

In step S1310, the UE may start the SI request prohibit timer for the cell, i.e., cell A, when one or more of the following conditions are met:
  If the RRC SI request procedure is unsuccessfully completed (i.e. if the UE RRC receives the RACH failure for SI request N times); and/or
  If the requested other SI has been not received yet for the cell.

While the SI request prohibit timer is running, if the UE camps on the same cell, i.e., cell A, the UE may not (re-)initiates the RRC SI request procedure and (re-)trigger the random access procedure for SI request for the cell.

In step S1311, the UE may perform cell reselection. While the SI request prohibit timer is running, if the UE camps on the same cell, i.e., cell A, and if the UE has not received the other system information yet, the UE may not (re-)initiates the RRC SI request procedure and (re-)trigger the random access procedure for SI request for the cell.

In step S1312, the SI request prohibit timer (and/or RACH prohibit timer) is expired, if one of the following conditions is met:
  when the timer reaches the value broadcast in system information; or
  when the UE reselects to anther cell; or
  when the UE receives the requested system information, i.e. the other system information; or
  when the UE enters RRC_CONNECTED state.

When the SI request prohibit timer is expired, the RACH prohibit timer is expired. If the timer is expired, and if the UE has not received the other system information yet, the UE may (re-)initiate the RRC SI request procedure and (re-)trigger the random access procedure for SI request for the cell.

Figure 14:
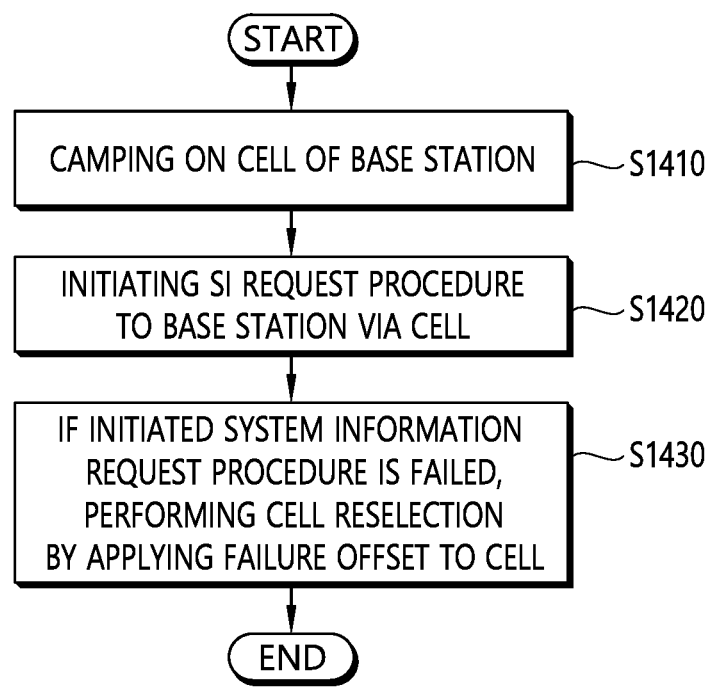
FIG. 14 is a block diagram illustrating a method for a UE to perform a cell reselection according to an embodiment of the present invention.

FIG. 14 is a block diagram illustrating a method for a UE to perform a cell reselection according to an embodiment of the present invention.

Referring to FIG. 14, in step S1410, the UE may camp on a cell of a base station.

In step S1420, the UE may initiate a SI request procedure to the base station via the cell.

In step S1430, if the initiated system information (SI) request procedure is failed, the UE may perform the cell reselection by applying a failure offset to the cell.

The cell reselection may be performed based on a cell ranking criterion to which the failure offset applies. The cell ranking criterion to which the failure offset applies may be smaller than a cell ranking criterion to which the failure offset is not applied. The failure offset may be applied to the cell ranking criterion for a serving cell, but failure offset may be not applied to the cell ranking criterion for a neighbouring cell.

The cell ranking criterion for the cell (Rs) may be defined by the Equation 4. The cell ranking criterion for a neighbouring cell (Rn) may be defined by the Equation 6.

The failure offset may be applied to the cell ranking criterion for a certain duration in the cell reselection. The certain duration may be fixed value. Alternatively, the certain duration may be configured by the base station.

The failure offset may be applied to the cell if the UE fails to request transmission of on-demand system information to the base station N times. The N may be one or more.

The failure offset may be applied to the cell if a requested system information message or a requested system information block in the initiated SI request procedure is not received for the cell.

Further, the UE may receive, from the base station, broadcast system information for the cell including whether transmission of on-demand system information is scheduled or not. The failure offset may be included in the broadcast system information.

According to an embodiment of the present invention, the failure offset be applied for calculating the cell ranking criterion for a serving cell and/or a neighbouring cell. For example, the Rs to which the failure offset applies may be smaller than previously Rs to which the failure offset is not applied. Alternatively, for example, the Rn to which the failure offset applies may be larger than previously Rn to which the failure offset is not applied. As a result, the UE can more easily reselect the neighboring cell, so that the problem such that the UE continuously perform RACH access at the edge of the cell while the requested SI has been not received can be solved.

Figure 15:
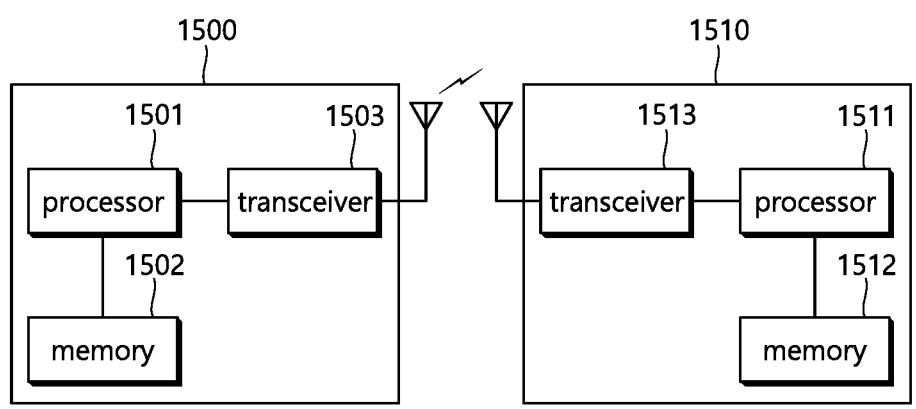
FIG. 15 is a block diagram illustrating a wireless communication system according to the embodiment of the present invention.

FIG. 15 is a block diagram illustrating a wireless communication system according to the embodiment of the present invention.

A BS 1500 includes a processor 1501, a memory 1502 and a transceiver 1503. The memory 1502 is connected to the processor 1501, and stores various information for driving the processor 1501. The transceiver 1503 is connected to the processor 1501, and transmits and/or receives radio signals. The processor 1501 implements proposed functions, processes and/or methods. In the above embodiment, an operation of the base station may be implemented by the processor 1501.

A UE 1510 includes a processor 1511, a memory 1512 and a transceiver 1513. The memory 1512 is connected to the processor 1511, and stores various information for driving the processor 1511. The transceiver 1513 is connected to the processor 1511, and transmits and/or receives radio signals. The processor 1511 implements proposed functions, processes and/or methods. In the above embodiment, an operation of the base station may be implemented by the processor 1511.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing, by a user equipment (UE), a cell reselection in a wireless communication system, the method comprising:
    camping on a cell of a base station;
    receiving, from the base station, broadcast system information for the cell,
    wherein the broadcast system information includes a failure offset, a timer value and information related to whether transmission of an on-demand system information (SI) is scheduled or not;
    initiating the on-demand SI request procedure to the base station via the cell;
    starting a timer related to the on-demand SI request procedure based on the failure for the on-demand SI request N times;
    performing the cell reselection by applying the failure offset to the cell based on the failure for the on-demand SI request N times; and
    transmitting, to the base station, the on-demand SI request at the reselected cell,
    wherein the N is an integer value,
    wherein the UE does not request on-demand SI to the base station via the cell, while the timer related to the on-demand SI request procedure is running, and
    wherein the timer related to the on-demand SI request procedure is expired based on performing the cell reselection.

2. The method of claim 1, wherein the cell reselection is performed based on a cell ranking criterion to which the failure offset applies.

3. The method of claim 2, wherein the cell ranking criterion to which the failure offset applies is smaller than a cell ranking criterion to which the failure offset is not applied.

4. The method of claim 2, wherein the failure offset is applied to the cell ranking criterion for a serving cell, and wherein the failure offset is not applied to the cell ranking criterion for a neighbouring cell.

5. The method of claim 2, wherein the cell ranking criterion for the cell (Rs) is defined by:

$$Rs = Qmeas,s + Qhyst - Qoffsetfailure - Qoffsettemp$$

where the Qmeas,s is reference signal received power (RSRP) measurement quantity for the cell, and the Qhyst is a hysteresis value, and the Qoffsetfailure is an offset value applied to the cell when the initiated SI request procedure is failed, and the Qoffsettemp is a temporary offset value.

6. The method of claim 5, wherein the cell ranking criterion for a neighbouring cell (Rn) is defined by:

$$Rn = Qmeas,n - Qoffset + Qoffsetfailure - Qoffsettemp$$

where the Qmeas,n is RSRP measurement quantity for the neighbouring cell, and the Qoffset is an offset value, and the Qoffsetfailure is an offset value applied to the neighbouring cell when the initiated SI request procedure is failed, and the Qoffsettemp is a temporary offset value.

7. The method of claim 1, wherein the timer value is fixed value.

8. The method of claim 1, wherein the failure offset is included in the broadcast system information.

9. The method of claim 1, wherein the UE communicates with at least one of a mobile terminal, a network or autonomous vehicles other than the UE.

10. A user equipment (UE) performing a cell reselection in a wireless communication system, the UE comprising:
    a memory; a transceiver; and
    a processor, connected to the memory and the transceiver, that:
    camps on a cell of a base station;
    receives, from the base station, broadcast system information for the cell,
    wherein the broadcast system information includes a failure offset, a timer value and information related to whether transmission of an on-demand system information (SI) is scheduled or not;
    initiates the on-demand SI request procedure to the base station via the cell;
    starts a timer related to the on-demand SI request procedure based on the failure for the on-demand SI request N times;
    performs the cell reselection by applying the failure offset to the cell based on the failure for the on-demand SI request N times; and
    transmits, to the base station, the on-demand SI request at the reselected cell,
    wherein the N is an integer value,
    wherein the UE does not request on-demand SI to the base station via the cell, while the timer related to the on-demand SI request procedure is running, and
    wherein the timer related to the on-demand SI request procedure is expired based on performing the cell reselection.

* * * * *